United States Patent [19]

Price

[11] Patent Number: 5,072,800
[45] Date of Patent: Dec. 17, 1991

[54] SUPPORT BEAM FOR A VEHICLE
[75] Inventor: Robert J. Price, Dunlap, Ill.
[73] Assignee: Caterpillar Inc., Peoria, Ill.
[21] Appl. No.: 625,797
[22] Filed: Dec. 11, 1990

Related U.S. Application Data

[63] Continuation of Ser. No. 513,695, Apr. 24, 1990, abandoned.

[51] Int. Cl.⁵ .................................................. B62D 55/084
[52] U.S. Cl. .................................... 180/9.48; 180/906; 280/144; 305/32
[58] Field of Search ............... 180/9.48, 906, 9.1; 280/144; 305/29, 32

[56] References Cited

U.S. PATENT DOCUMENTS

| | | | |
|---|---|---|---|
| 1,705,578 | 3/1920 | Lichtenberg | 180/906 |
| 2,165,551 | 7/1939 | Iverson | 180/906 |
| 2,786,724 | 3/1957 | Armington et al. | 305/9 |
| 2,936,841 | 5/1960 | Mazzarins | 180/9.54 |
| 2,988,159 | 6/1961 | Weber | 180/9.5 |
| 3,198,275 | 8/1965 | Royer | 180/9.6 |
| 3,825,088 | 7/1974 | Copeland | 180/9.5 |
| 4,232,754 | 11/1980 | Corrigan et al. | 180/9.5 |
| 4,341,276 | 7/1982 | Furuichi | 180/9.48 |
| 4,350,222 | 9/1982 | Lutteke et al. | 180/706 |
| 4,690,231 | 9/1987 | Riml | 180/6.48 |

FOREIGN PATENT DOCUMENTS 8001554  8/1980  World Int. Prop. O. ........... 180/9.1

Primary Examiner—Charles A. Marmor
Assistant Examiner—Mitchell Bompey
Attorney, Agent, or Firm—Claude F. White

[57] ABSTRACT

A support beam, for supporting and connecting a track-type vehicle on first and second roller frame assemblies, has first and second end portions connected to a respective track roller frame and a middle portion connected to the vehicle. The connections between the track roller frames and the support beam provide adjustment of the track roller frames to various lateral positions, thereby providing various gage settings of the track of the vehicle.

9 Claims, 8 Drawing Sheets

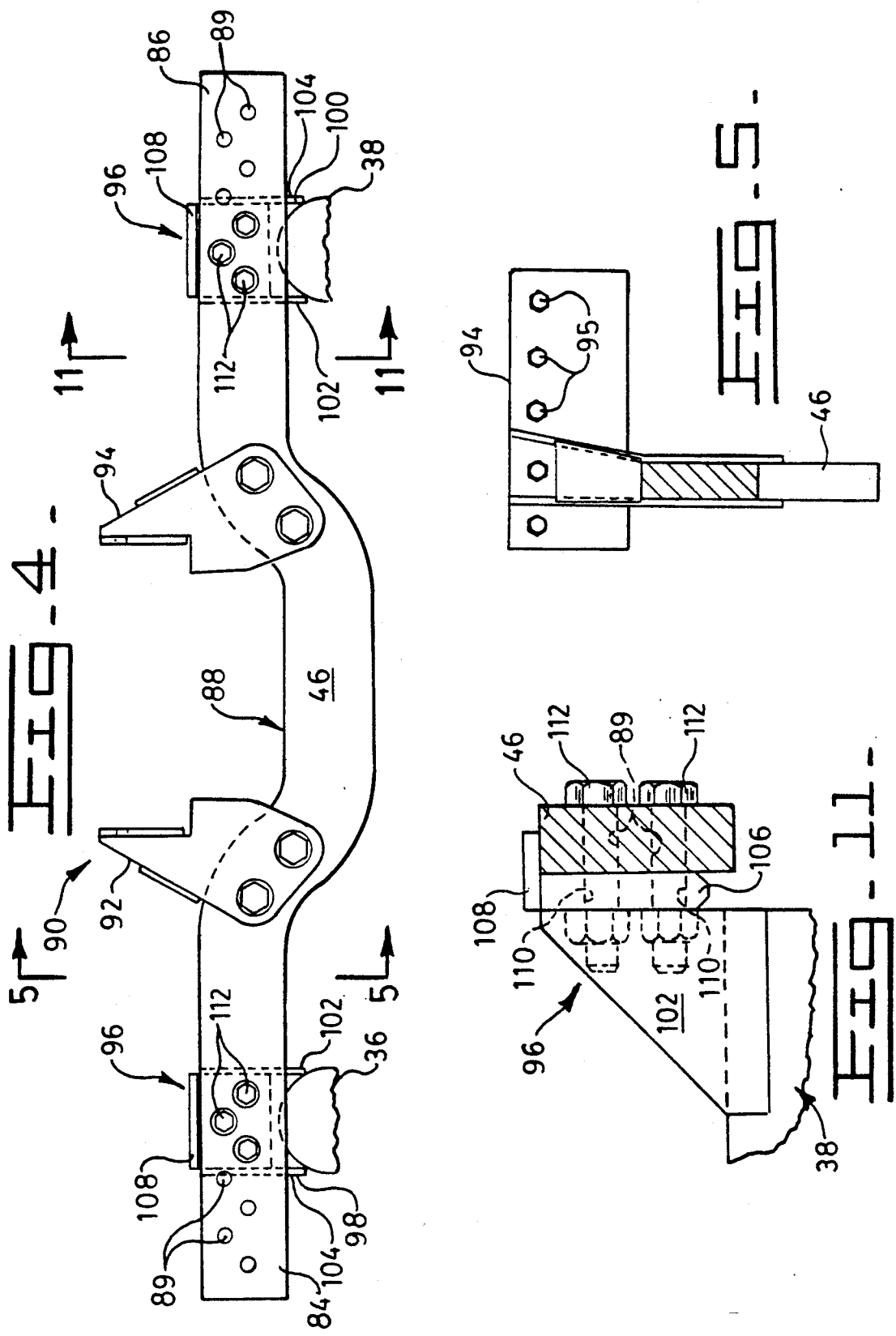

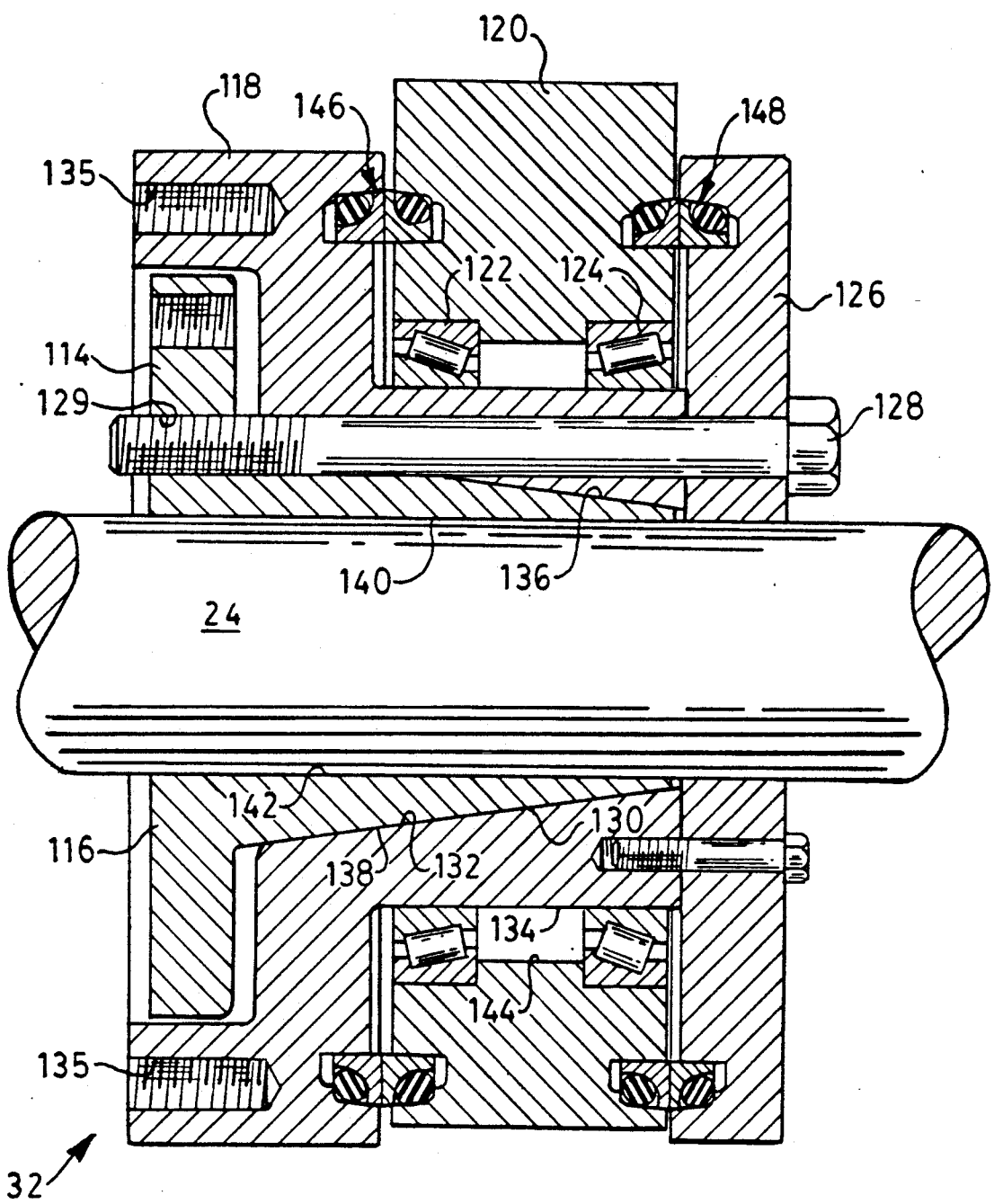
Fig_6_

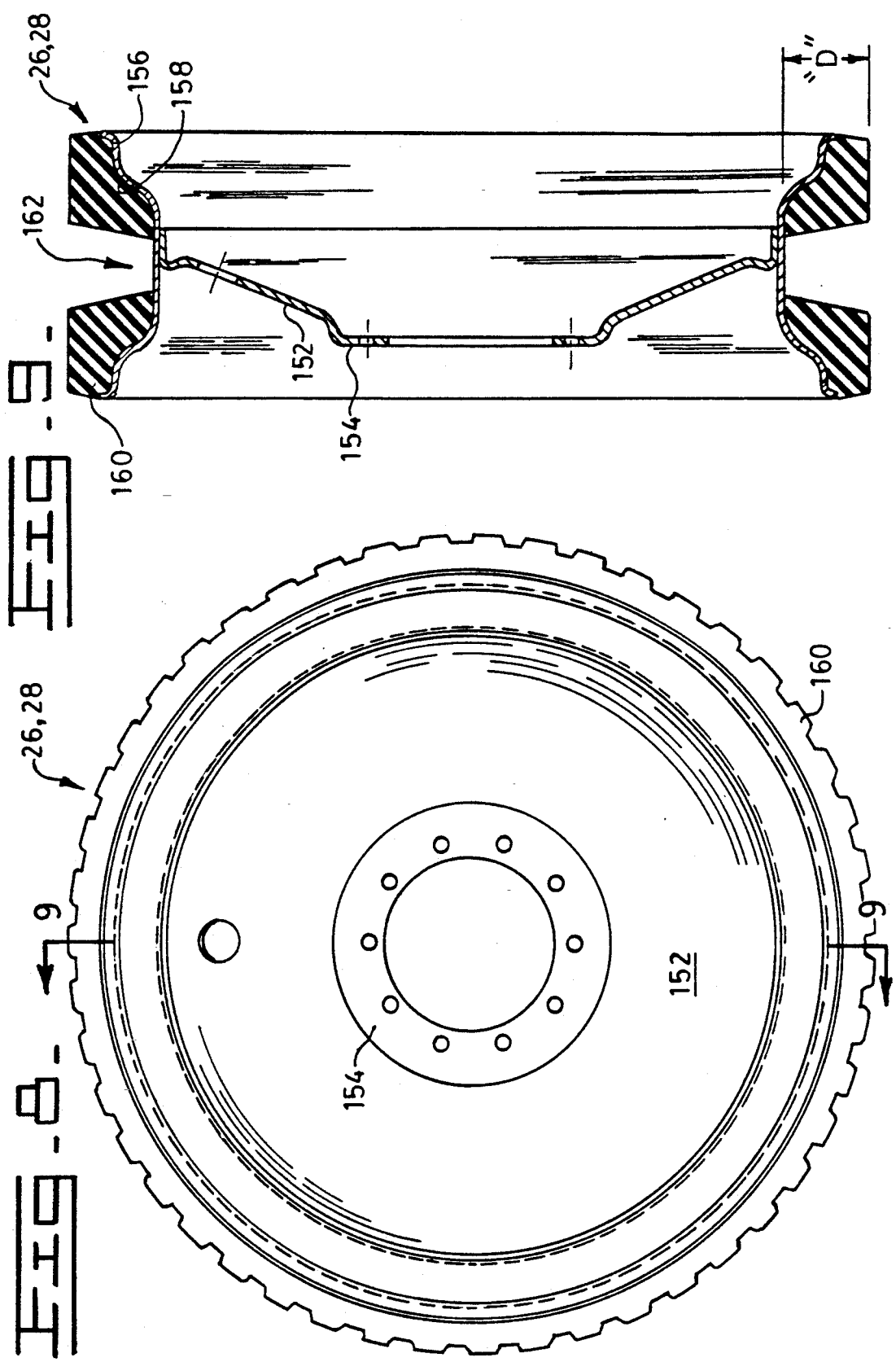

SUPPORT BEAM FOR A VEHICLE

This is a continuation of Ser. No. 07/513,695, filed Apr. 24, 1990, now abandoned.

DESCRIPTION

1. Technical Field

This invention relates generally to a support beam for a vehicle and more particularly to a support beam which connects a pair of auxiliary frame assemblies to the vehicle and adjustably supports the vehicle on the auxiliary frame assemblies.

2. Background Art

Construction, earthmoving, and agricultural type work vehicles are often equipped with endless self-laying track chain assemblies for support and propulsion of the vehicle. Such prior art track-type vehicles, utilizing metal track chain assemblies, are generally low speed vehicles and work in environments not requiring relatively high ground clearance beneath the vehicle. More recently, work vehicles having endless, inextensible elastomeric track belts have been employed to perform work tasks previously accomplished by metal track equipped vehicles. The elastomeric track belt vehicles have many advantages over metal track vehicles and also over wheel type vehicles. Some of these advantages include less weight and maintenance, lower soil compaction, and the ability to travel on improved roadways.

The prior art track-type vehicles generally utilize some type of equalizer bar which is connected to the vehicle frame at the center of the bar and connected to the track assemblies at opposite ends of the bar. These connections are often pivot type connections to allow the track assemblies to oscillate relative to the vehicle frame and to each other.

One type of equalizer bar for a vehicle is disclosed in U.S. Pat. No. 2,936,841 issued to J. Mazzarins on May 17, 1960. In this patent, the equalizer bar is connected to the vehicle by a resilient bushing and is connected to the track frame assemblies by spherical ball and socket members. This type equalizer bar mounting provides a resilient suspension and is intended to resist various types of loads imparted to the vehicle and equalizer bar. This particular construction does not provide any type of lateral adjustment between the equalizer bar and the track frame assemblies.

Another type of equalizer bar for a track-type vehicle is disclosed in U.S. Pat. No. 2,988,159 issued to F. Webber on June 13, 1961. In this patent, the center of the equalizer bar is pinned to the vehicle frame and each end is connected to the track frames by a cylindrical portion mounted in a cylindrical trunnion. The cylindrical ends of the equalizer bar can move in and out of the cylindrical trunnions as the track frames pivot up and down. As in the previously noted patent, there is no provision for lateral adjustment of the track frames on the equalizer bar.

The present invention is directed to overcoming one or more of the problems as set forth above.

DISCLOSURE OF THE INVENTION

In one aspect of the present invention, a support beam for connecting and supporting a vehicle on first and second auxiliary frame assemblies includes a one-piece solid metal beam having first and second end portions and a middle portion. When connected to the vehicle and frame assemblies, the middle portion of the support beam is at a lower elevational position than the end portions. The support beam includes means for connecting each of the auxiliary frames to a respective end portion of the beam at a plurality of connected positions.

Prior art vehicles utilized in agricultural operations are generally equipped with a plurality of wheels which support and propel the vehicle. The wheels provide high ground clearance for crop cultivation and are generally adjustable to accommodate various row crop spacings. Wheel type vehicles, however, tend to cause undesirable soil compaction and their use is somewhat limited in wet soil conditions. Track-type vehicles provide greater traction in wet soil conditions and less soil compaction, but are limited in their ground clearance and the tracks cannot be adjusted to accommodate different row crop spacings.

The subject invention provides a support beam for a vehicle including means to laterally adjust the connected position of each track frame on the support beam, which provides a plurality of gage widths of the track assemblies.

BRIEF DESCRIPTION OF THE DRAWINGS

FIG. 4 is a diagrammatic front elevational view of a support beam of the present invention;

FIG. 5 is a diagrammatic sectional view of the support beam, taken generally along lines 5—5 of FIG. 4;

FIG. 6 is a diagrammatic sectional view, on an enlarged scale, of a clamp assembly of the present invention, taken in the circled area of FIG. 3;

FIG. 8 is a diagrammatic side elevational view of a drive wheel assembly of the present invention;

FIG. 9 is a diagrammatic sectional view taken generally along the lines 9—9 of FIG. 8;

FIG. 11 is a diagrammatic sectional view of a connecting means of the present invention, taken generally along lines 11—11 of FIG. 4.

BEST MODE FOR CARRYING OUT THE INVENTION

Figure 1:
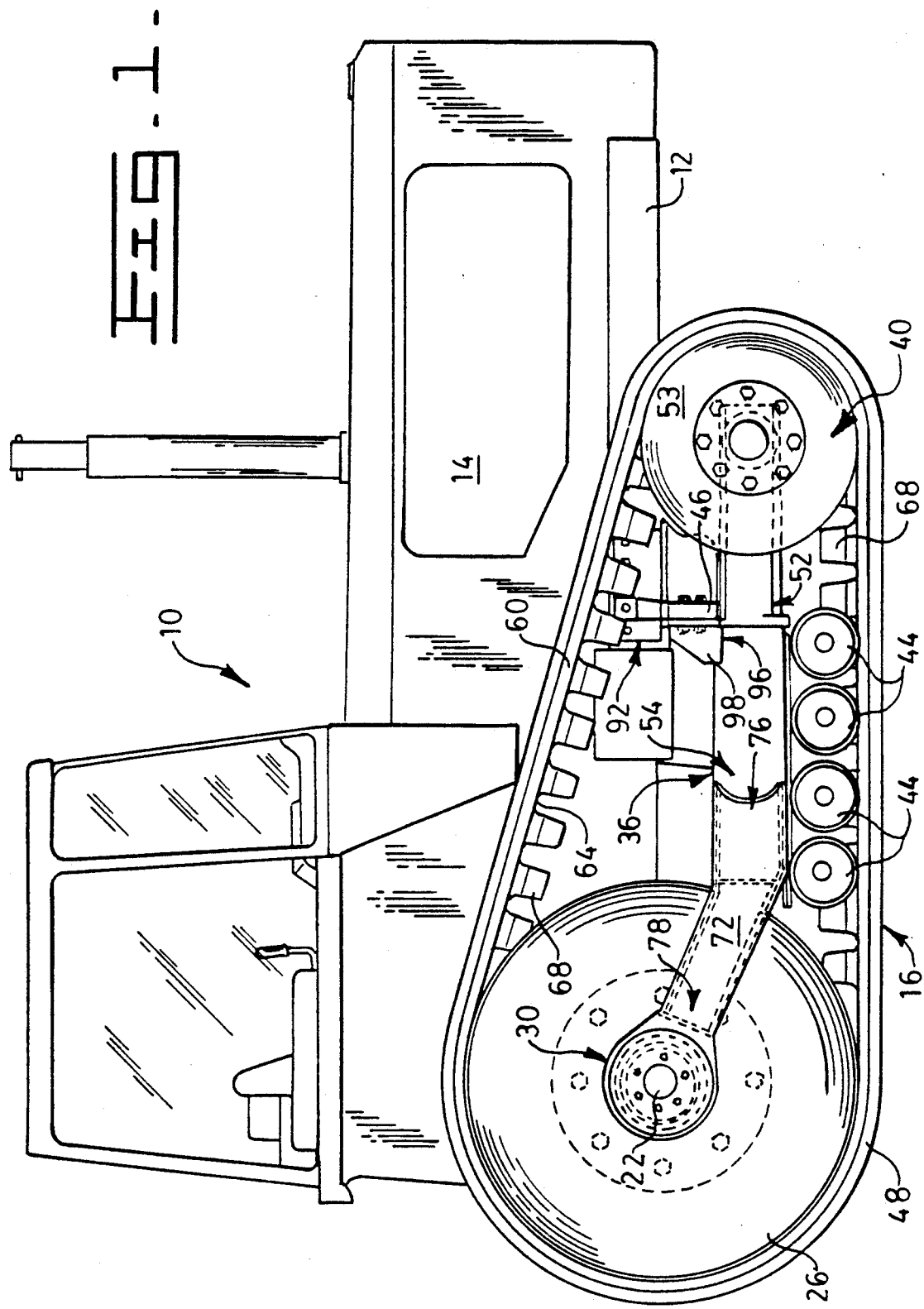
FIG. 1 is a diagrammatic side elevational view of a vehicle incorporating the subject invention.
Figure 2:
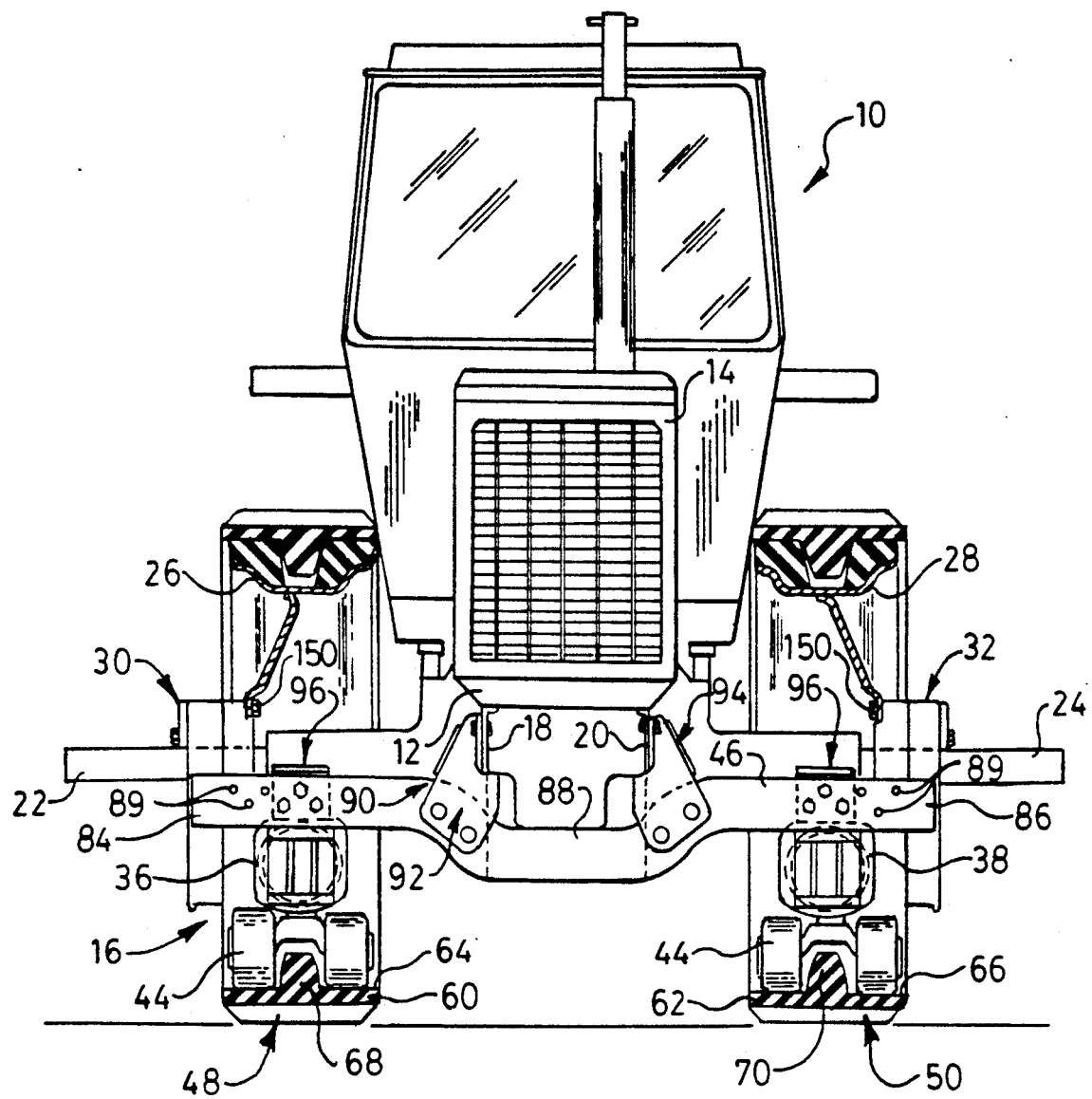
FIG. 2 is a diagrammatic front elevational view of the vehicle shown in FIG. 1.
Figure 3:
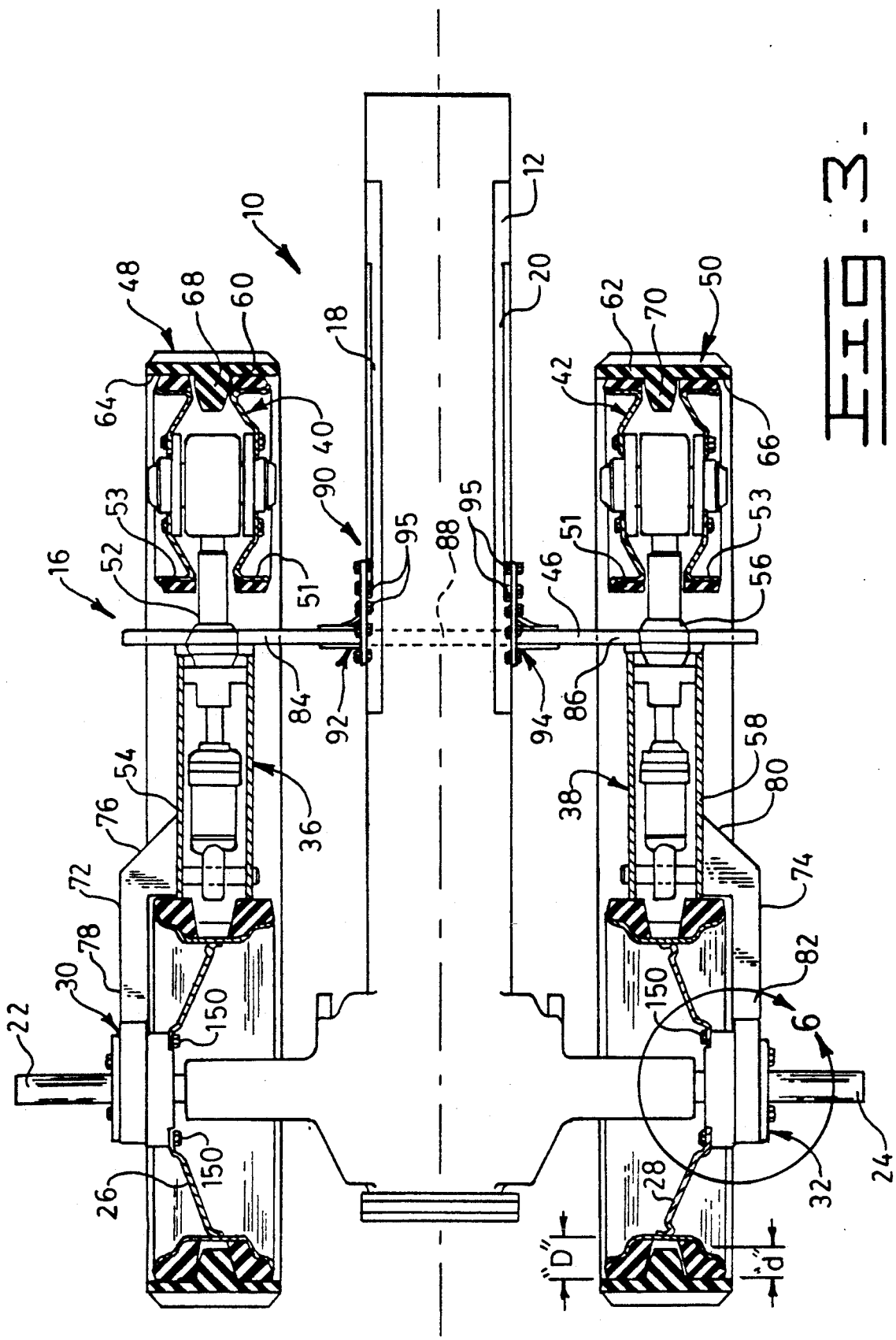
FIG. 3 is a diagrammatic bottom plan view, partly in section, of the vehicle shown in FIG. 1.
Figure 7:
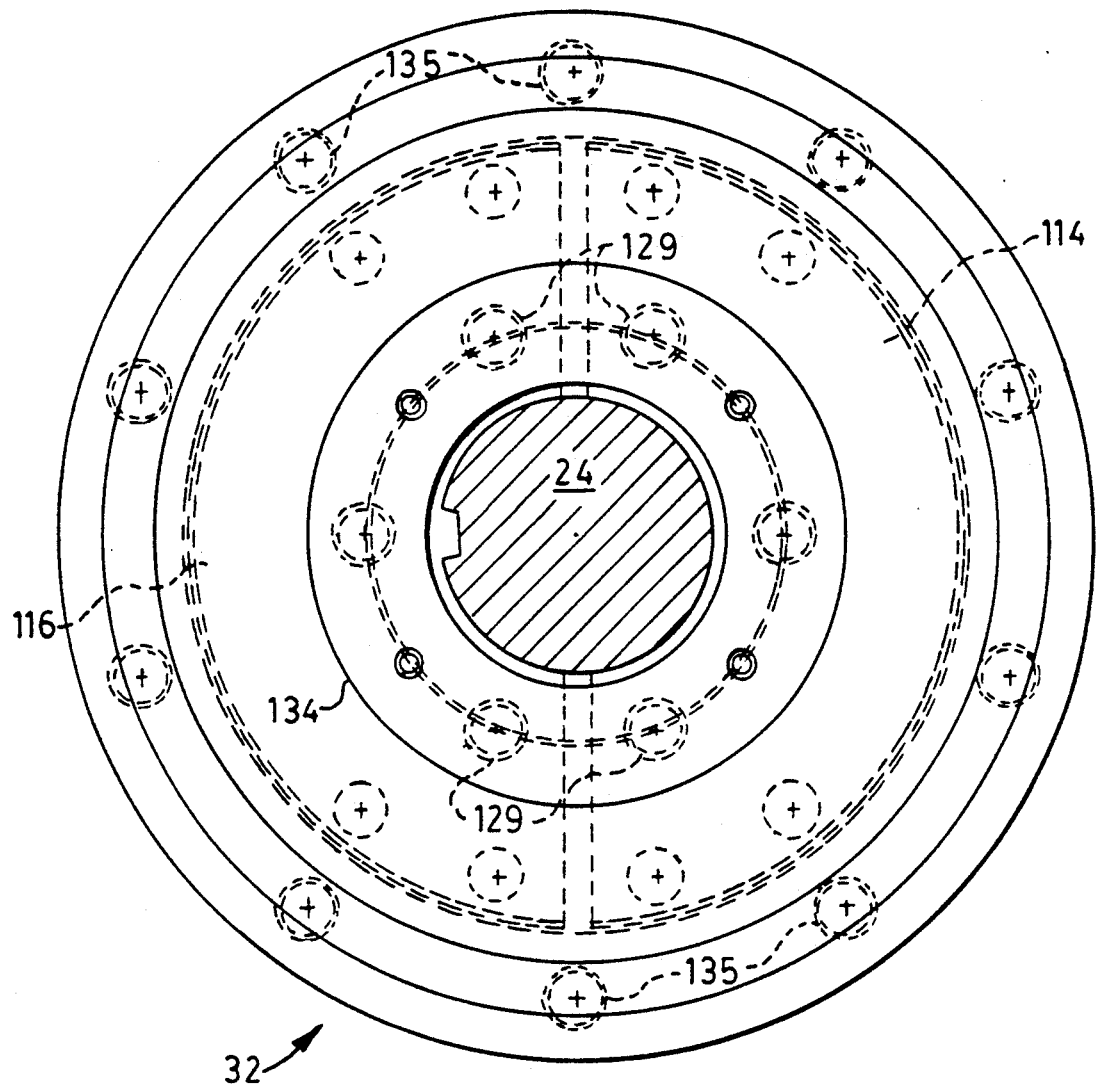
FIG. 7 is a diagrammatic side elevational view, partly in section, and on an enlarged scale, of a portion of the clamp assembly shown in FIG. 6.
Figure 10:
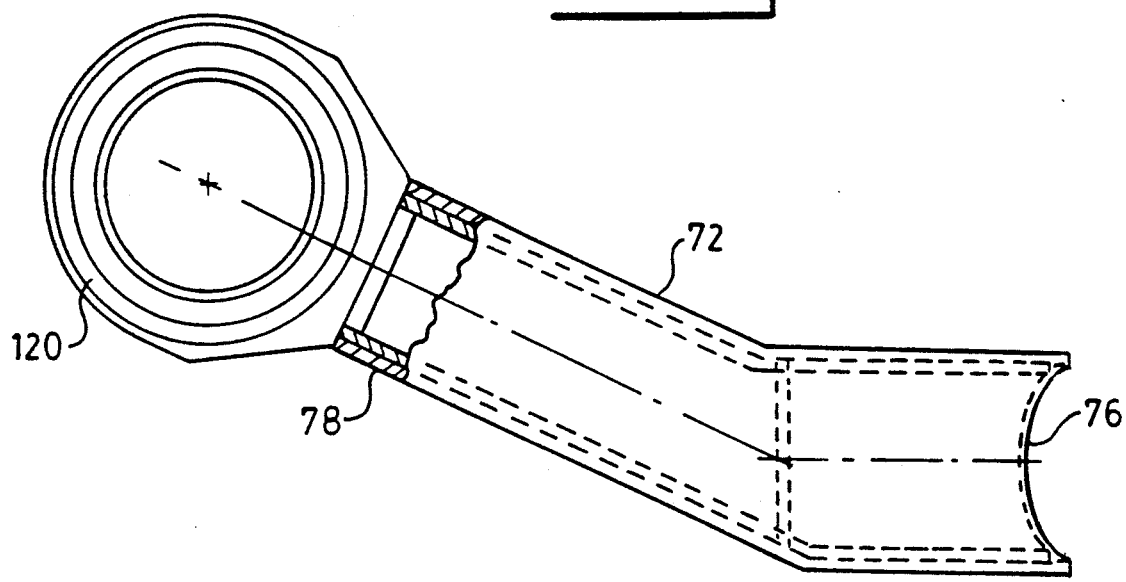
FIG. 10 is a diagrammatic side elevational view of a roller frame extension of the present invention.

Referring to the drawings, a track laying work vehicle 10 has a main frame assembly 12, a power generating means such as an engine 14, and an undercarriage assembly 16. The main frame assembly 12 includes first and second opposed spaced apart parallel side portions 18, 20. First and second drive axles 22,24 are rotatably connected to and powered by the engine 14 through a transmission and other standard control mechanisms, which are well known in the art. First and second drive wheels 26,28 are rotatably connected respectively to the first and second drive axles 22,24 through first and second friction clamp assemblies 30,32. As will be explained in greater detail hereinafter, the clamp assemblies 30,32 are releasably connected to a respective drive axle 22,24 and the drive wheels 26,28 are connected to a respective clamp assembly 30,32.

The vehicle 10 is supported and propelled by the undercarriage assembly 16, which includes first and second auxiliary roller frame assemblies 36,38 first and second idler wheel assemblies 40,42, a plurality of guide rollers 44, a rigid roller frame support beam 46, and first and second endless track assemblies 48,50. Each idler wheel assembly includes first and second spaced apart idler wheels 51,53. Each of the track assemblies 48,50 encircles a respective one of the drive wheels 26,28, the roller frame assemblies 36,38, the guide rollers 44, and the idler wheel assemblies 40,42. The guide rollers 44 are rotatably connected to the roller frame assemblies 36,38. Each of the roller frame assemblies 36,38 has first and second end portions 52,54 and 56,58 respectively, and each roller frame assembly 36,38 is substantially parallel to each other and spaced from a respective main frame side portion 18,20. Each of the idler wheel assemblies 40,42 is rotatably connected to a respective first end portion 52,56 of the roller frame assemblies 36,38. In the preferred embodiment, the track assemblies 48,50 include endless elastomeric belts 60,62. Each belt 60,62 has a respective inner friction drive surface 64,66 and a plurality of guide blocks 68,70 bonded to, or integrally formed with the inner drive surfaces 64,66.

The undercarriage assembly 16 further includes first and second roller frame extensions, or arm members, 72,74 with each being connected between a respective clamp assembly 30,32 and a roller frame assembly 36,38. Each roller frame extension 72,74 has first and second end portions 76,78 and 80,82 respectively, with the first end portions 76,80 being connected to a respective second end portion 54,58 of the roller frame assemblies 36,38, and the second end portions 78,82 being connected to a respective drive axle 22,24 through the first and second clamp assemblies 30,32. These connections are the only connections between the second end portions of the roller frame assemblies 36,38 and the vehicle 10.

The support beam 46 has first and second end portions 84,86 and a middle portion 88. Each of the first and second end portions 84,86 has a plurality of first mounting holes 89 which are arranged in a preselected pattern. The middle portion 88 extends transverse to and beneath the main frame assembly 12 and is releasably connected to the first and second side portions 18,20 by a first means 90, including first and second hanger assemblies 92,94. The hanger assemblies 92,94 are removably connected to the main frame side portions 18,20 by a plurality of threaded fasteners 95. Each of the first and second end portions 84,86 of the support beam 46 are releasably connected by a second connecting means 96 to a respective first end portion 52,56 of the roller frame assemblies 36,38. The second connecting means 96 includes first and second bracket assemblies 98,100 which provide a plurality of connected positions between each end portion 84,86 of the support beam 46 and the respective roller frame assembly 36,38. The roller frame assemblies 36,38 are moveable along the respective support beam end portions 84,86 and are connectable at the different positions to provide a variable gage of the track assemblies 48,50.

With particular reference to FIGS. 1, 2, 4, and 11, each of the bracket assemblies 98,100 includes first and second parallel plates 102, 104, joined together by a third plate 106. A fourth plate 108 is joined to the top surface of the third plate 106. The third plate 106 has a plurality of second mounting holes 110 arranged in a second preselected pattern. Each plate 106 is removably connected to the support beam 46 by a plurality of threaded fasteners 112 which penetrate respective holes 89 in the support beam 46 and holes 110 in the plate 106. The bracket assemblies 98,100, and the attached roller frame assemblies 38,40, can be moved along the support beam 46 and connected to the support beam at a plurality of positions, wherever the second preselected pattern of holes in the plates 106 align with one of the first preselected patterns of holes in the support beam 46. Although the support beam 46 has been illustrated with a plurality of connecting and adjusting holes 89, these holes 89 could be replaced with a plurality of elongated slots. Such slots would provide even greater lateral adjusting capabilities.

With particular reference to FIGS. 3, 6, 7, and 10, the first and second clamp assemblies 30,32 are substantially identical, and therefore the specific description of the clamp assembly 32, shown in FIG. 6 will apply also to the clamp assembly 30. The clamp assembly 32 includes first and second wedge members 114,116, a hub member 118, a bearing cage 120, first and second bearing assemblies 122,124, a retainer plate 126, and means for connecting the various clamp members together, including a plurality of threaded fasteners 128. The threaded fasteners are adapted to mate with a plurality of threaded holes 129 in the wedge members 114,116. The hub member 118 has an internal cavity 130 having a tapered wall portion 132, and a journal portion 134 adapted to receive the inner races of the bearing assemblies 122,124. The hub member also has a plurality of threaded holes 135. The wedge members 114,116 have outer taper wall portions 136,138 respectively, which are adapted to mate with the tapered wall portion 132 of the hub member 118. The wedge members 114,116 also have inner wall surfaces 140,142 respectively, which are adapted to mate with and clamp onto the drive axle 24. When the clamp assemblies 30,32 are not securely clamped against the drive axles 22,24, they are laterally moveable along the axles 22,24. Since the drive wheels 26,28 are connected to the clamp assemblies 30,32, the drive wheels are also laterally moveable along the drive axles to vary the track gage. The bearing cage 120 has a stepped internal bore 144 which is adapted to receive the outer races of the bearing assemblies 122,124. The bearing assemblies 122,124 are therefore positioned between the bearing cage bore 144 and the hub member journal portion 134 and provide relative rotation between the hub member 120 and the other members of the clamp assembly 32. First and second seal assemblies 146,148 are positioned between the hub member 118 and the bearing cage 120 and between the retainer plate 126 and the bearing cage 120 respectively.

Each of the drive wheels 26,28 is rotatably connected to a respective drive axle through a respective clamp assembly 30,32. Each of the drive wheels 26,28 is connected to the hub member 118 by a plurality of threaded fasteners 150, which mate with the thread holes 135. With particular reference to FIGS. 1, 2, 3, 8, and 9, each of the drive wheels 26,28 includes a disc portion 152 having a mounting surface 154, and a rim portion 156 having an inwardly directed recess 158. The rim portion 156 has a layer of elastomeric material 160 bonded thereto which, with the recess 158, provides a deep recess 162 which has a preselected depth dimension "D". Each of the guide blocks 68,70 has a preselected height dimension "d" and the deep recess 160 is adapted to receive the guide blocks 68,70. The preselected dimensions of the recess 160 and the guide blocks 68,70 provide that depth dimension "D" is greater than height dimension "d". As can be seen from FIG. 1, the drive wheels 26,28 have a diameter which is larger than the diameter of the idler wheels 51,53. As is evident from FIG. 3, each of the drive wheels 26,28 is connected to a respective drive axle 22,24 at a position between the main frame and a respective roller frame extension 72,74.

Figure 12:
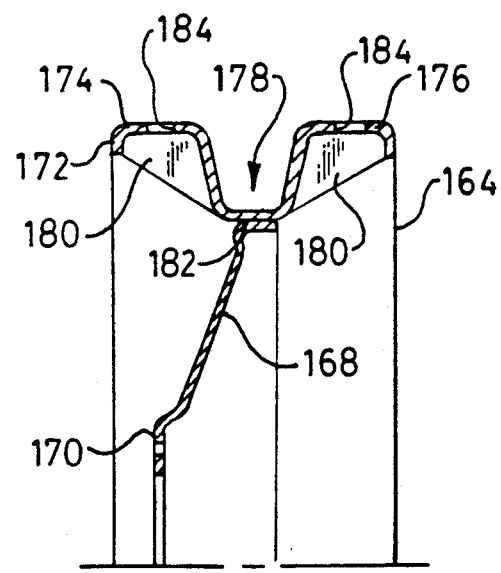
FIG. 12 is a diagrammatic partial sectional view of another embodiment of a drive wheel assembly of the present invention.
Figure 13:
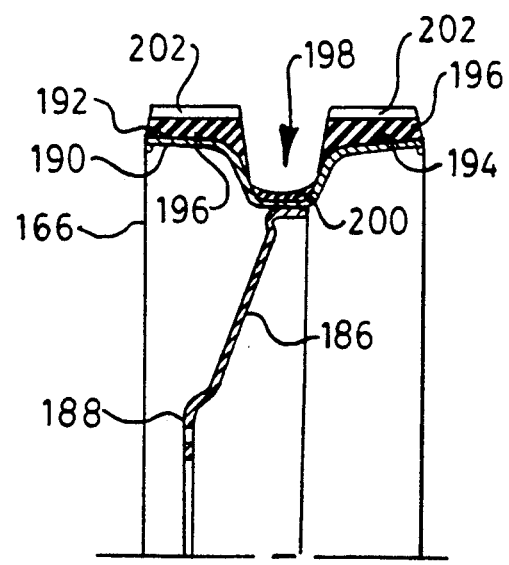
FIG. 13 is a diagrammatic partial sectional view of yet another embodiment of a drive wheel assembly of the present invention.

With particular reference to FIGS. 12 and 13, two other embodiments of one-piece drive wheels 164 and 166 are shown. Drive wheel 164 includes a disc portion 168 having a mounting surface 170, and a rim portion 172. The rim portion 172 has first and second spaced rim surfaces 174,176 which frictionally contact the elastomeric belts 60,62. A deep recess 178 is formed between the rim surfaces 174,176 to accommodate the guide blocks 68,70. The rim portion 172, including rim surfaces 174,176 are entirely metallic with the rim portion 172 being press formed or formed by casting. Spaced reinforcing ribs 180 can be provided to strengthen the rim surfaces 174,176. The disc portion 168 and the rim portion 172 are generally formed as individual members and are joined in any suitable manner at a joint 182. If desirable, spaced openings 184 can be provided in the rim surfaces 174,176 to create enhanced traction between the rim surfaces 174,176 and the inner drive surfaces 64,66 of the belts 60,62. These openings 184 will also allow foreign material to be expelled from the rim surfaces 174,176 and the drive surfaces 64,66.

Drive wheel 166 is similar to the drive wheels 26,28 and includes a disc portion 186 having a mounting surface 188, and a rim portion 190 having first and second rim surfaces 192,194. Each of the rim surfaces 192,194 has a layer of elastomeric material 196 bonded, or formed, thereon. A moderately deep recess 198 is formed between the rim surfaces 192,194 and, together with the layer of elastomeric material 196 forms a recess to accommodate the guide blocks 68,70. If desirable, a small layer of elastomeric material 200 can be provided at the base of the recess 198 to reduce packing of foreign material in the recess 198. The elastomeric material 196 is provided with spaced lugs or grousers 202 which enhance friction drive characteristics between the belts 60,62 and the drive wheel 166 by allowing foreign material to escape.

INDUSTRIAL APPLICABILITY

With reference to the drawings, the subject track laying vehicle 10 is particularly useful as an agricultural type work vehicle. It is advantageous that such a vehicle 10 have good traction, low ground pressure, low soil compaction, relatively high ground clearance, and have variable gage capabilities. The variable gage is especially useful for operating the vehicle in agricultural fields having different row crop spacings.

The vehicle 10 is supported and propelled by an undercarriage assembly 16 which includes first and second roller frame assemblies 36,38, first and second idler wheel assemblies 40,42, first and second drive wheels 26,28, and first and second endless elastomeric track assemblies 48,50. The idler wheel assemblies 40,42 are rotatably connected to the first end portions 52,56 of the roller frame assemblies 36,38 and the drive wheels 26,28 are rotatably connected to and powered by the drive axles 22,24. These connections include first and second friction clamp assemblies 30,32 to which the drive wheel 26,28 are connected respectively.

The clamp assemblies 30,32 include tapered wedge members 114,116 which are frictionally clamped onto the drive axles 22,24 and to the tapered wall portions 132 of the hub members 118. The wedge members are forced into contact with the axles 22,24 and the tapered wall portions 132 by a plurality of threaded fasteners 128 which extend through the retainer plate 126, the hub member 118, and into the threaded holes 129 in the wedge members 114,116. The bearing cage 120 is connected to second end portions 78,82 of the first and second arm members 72,74, and the bearing assemblies 122,124 provide relative rotation between the bearing cage 120 and the other members of the clamp assemblies 30,32. When the threaded fasteners 128 are loosened, the frictional force between the wedge members 114,116 and the drive axles 22,24 is released and the clamp assemblies 30,32, including drive wheels 26,28, can be moved laterally to any other position on the drive axles 22,24. However, the connections between the support beam 46 and each roller frame assembly 36,38 must also be released before the clamp assemblies 30,32 can be moved, since the clamp assemblies 30,32 are connected to the roller frame assemblies 36,38 through the bearing cage and the arm members 72,74.

To release the connection between the support beam 46 and the roller frame assemblies 36,38, the threaded fasteners 112 are removed from the support beam 46 and the bracket assemblies 98,100. With the threaded fasteners 112 removed, the brackets 98,100, which are connected to the roller frame assemblies 36,38, can be moved to another lateral position on the support beam 46 until the holes in the plate 106 align with the mating holes 89 in the support beam 46. At this same time, the threaded fasteners 128 are threaded into the threaded holes 129 in the wedge members 114,116 to again frictionally clamp the wedge members 114,116 against the drive axles 22,24 and against the tapered wall portions 132. The threaded fasteners 112 are then reconnected to the support beam 46 and the bracket assemblies 98,100. While the roller frame assemblies 36,38 are being adjusted, the vehicle must be supported in some manner to relieve the weight on the roller frame assembly being adjusted. This can be accomplished in several ways, including a lifting device supporting the rear axle and the front support beam 46.

Additional adjustability, to increase the gage width of the roller frame assemblies 36,38, is possible by reversing the similar roller frame assemblies side to side. This would position the arm members 72,74 and the clamp assemblies 30,32 to the inside and the drive wheels 26,28 to the outside.

Other aspects, objects and advantages of this invention can be obtained from a study of the drawings, the disclosure, and the appended claims.

I claim:
1. A support beam for connecting and supporting a vehicle on first and second auxiliary frame assemblies, said vehicle having a main frame, comprising:
   an elongated beam having first and second end portions, a middle portion and first and second transition portions connecting respectively said first and second end portions to said middle portion, said beam having a substantially rectangular configuration in cross-section;

means for releasably connecting each of said auxiliary frames to a respective end portion of the support beam; and first and second hanger assemblies connected to said main frame of said vehicle and connected respectively to said first and second transition portions of said support beam, said hanger assemblies being adapted to support said vehicle on said support beam during operation of said vehicle.

2. A support beam for connecting and supporting a vehicle on first and second auxiliary frame assemblies, said vehicle having a main frame having first and second side portions, comprising;

an elongated one-piece solid metal beam having first and second end portions, a middle portion, and first and second transition portions connecting respectively said first and second end portions to said middle portion, said first and second end portions each having first and second planar surfaces and said middle portion having third and fourth planar surfaces with the first and second planar surfaces of said end portions being substantially parallel with the third and fourth surfaces of said middle portion, said beam having a rectangular configuration in cross-section, and said middle portion being at a lower elevational position than said first and second end portions when said beam is viewed in elevation from the front, rear, or end;

means for releasably connecting each of said auxiliary frames to a respective end portion of the support beam at a plurality of connected positions; and first and second hanger assemblies connected respectively to said first and second side portions of said main frame of said vehicle and connected respectively to said first and second transition portions of said support beam, said hanger assemblies being adapted to support said vehicle on said support beam during operation of said vehicle.

3. The support beam, as set forth in claim 2, wherein said connecting means includes a plurality of first apertures through said first and second end portions, first and second brackets connected to said first and second auxiliary frame assemblies, a plurality of second apertures through said brackets, and a plurality of threaded fasteners adapted to penetrate said first and second apertures.

4. The support beam, as set forth in claim 2, wherein said connecting means includes a plurality of holes in said first and second end portions, said holes being arranged in a plurality of first adjacent repeating patterns.

5. The support beam, as set forth in claim 4, wherein each of said hole patterns forms a triangle.

6. The support beam, as set forth in claim 4, wherein at least one of said holes in each of said patterns is used to form a portion of the adjacent hole pattern.

7. The support beam, as set forth in claim 4, including first and second brackets, each of said brackets having a plurality of holes arranged in a second pattern, and further including a plurality of threaded fasteners, said threaded fasteners adapted to penetrate selected ones of said holes in said support beam and the holes in said brackets when one of said first hole patterns aligns with said second hole pattern.

8. The support beam, as set forth in claim 7, wherein said first and second end portions of said beam each have a support surface, each of said brackets has a lip portion, and said lip portion is adapted to contact said support surface.

9. The support beam, as set forth in claim 2, wherein each of said hanger assemblies includes a mounting plate, and a plurality of threaded fasteners, said fasteners adapted to penetrate said mounting plates and releasably secure said support beam to said vehicle.

* * * * *